United States Patent [19]

Ugon et al.

[11] Patent Number: 4,807,288
[45] Date of Patent: Feb. 21, 1989

[54] MICROPROCESSOR INTENDED PARTICULARLY FOR EXECUTING THE CALCULATION ALGORITHMS OF A PUBLIC CODE ENCODING SYSTEM

[75] Inventors: Michel Ugon, Maurepas; Louis Guillou, Bourgbarre, both of France

[73] Assignees: C.I.I. Honeywell Bull, Paris; Etat Francais represente par le Ministre des P.T.T. (C.N.E.T.), Issy Les Moulineaux; Establissement Public de diffusion dit Telediffusion de France, Montrouge, all of France

[21] Appl. No.: 556,414

[22] Filed: Nov. 30, 1983

[30] Foreign Application Priority Data

Nov. 30, 1982 [FR] France ............... 82 20051

[51] Int. Cl.$^4$ ............................................. H04L 9/04
[52] U.S. Cl. ................................... 380/30; 380/4; 380/25; 235/382; 364/200
[58] Field of Search ............... 178/22.08, 22.09, 22.11; 235/380, 382, 382.5; 380/4, 23, 25, 30; 364/200, 900

[56] References Cited

U.S. PATENT DOCUMENTS

| | | | |
|---|---|---|---|
| 4,168,396 | 9/1979 | Best | 178/22.09 |
| 4,211,919 | 7/1980 | Ugon | 178/22.09 |
| 4,278,837 | 7/1981 | Best | 178/22.09 |
| 4,433,207 | 2/1984 | Best | 380/4 |
| 4,453,074 | 6/1984 | Weinstein | 235/380 |
| 4,467,139 | 8/1984 | Mollier | 380/23 |
| 4,471,216 | 9/1984 | Herve | 178/22.09 |
| 4,549,075 | 10/1985 | Saada et al. | 380/23 |
| 4,598,170 | 7/1986 | Piosenka et al. | 380/23 |
| 4,612,413 | 9/1986 | Robert et al. | 380/23 |
| 4,633,388 | 12/1986 | Chiv | 380/23 |
| 4,656,474 | 4/1987 | Mollier et al. | 380/23 |
| 4,748,668 | 5/1988 | Shamir et al. | 380/30 |

OTHER PUBLICATIONS

French Search Report.
Article in the Journal "ACM".
Article of "AFIPS Conference Proceedings".

*Primary Examiner*—Salvatore Cangialosi
*Attorney, Agent, or Firm*—Oblon, Fisher, Spivak, McClelland & Maier

[57] ABSTRACT

One chip microprocessor, which is more particularly designed to execute calculation algorithms of a public code encoding system formed by a public function and a secret inverse function of the type comprising at least one programmable read-only memory, a processing unit and an input/output device, wherein it comprises a memory, in which is recorded at least one algorithm corresponding to the performance of said secret function, and wherein the programmable read-only memory contains the secret parameters constituting the secret code and recorded in an area of the read-only memory which is inaccesible from the outside, the processing unit including the multiplying circuits necessary for the execution of the algorithm.

14 Claims, 1 Drawing Sheet

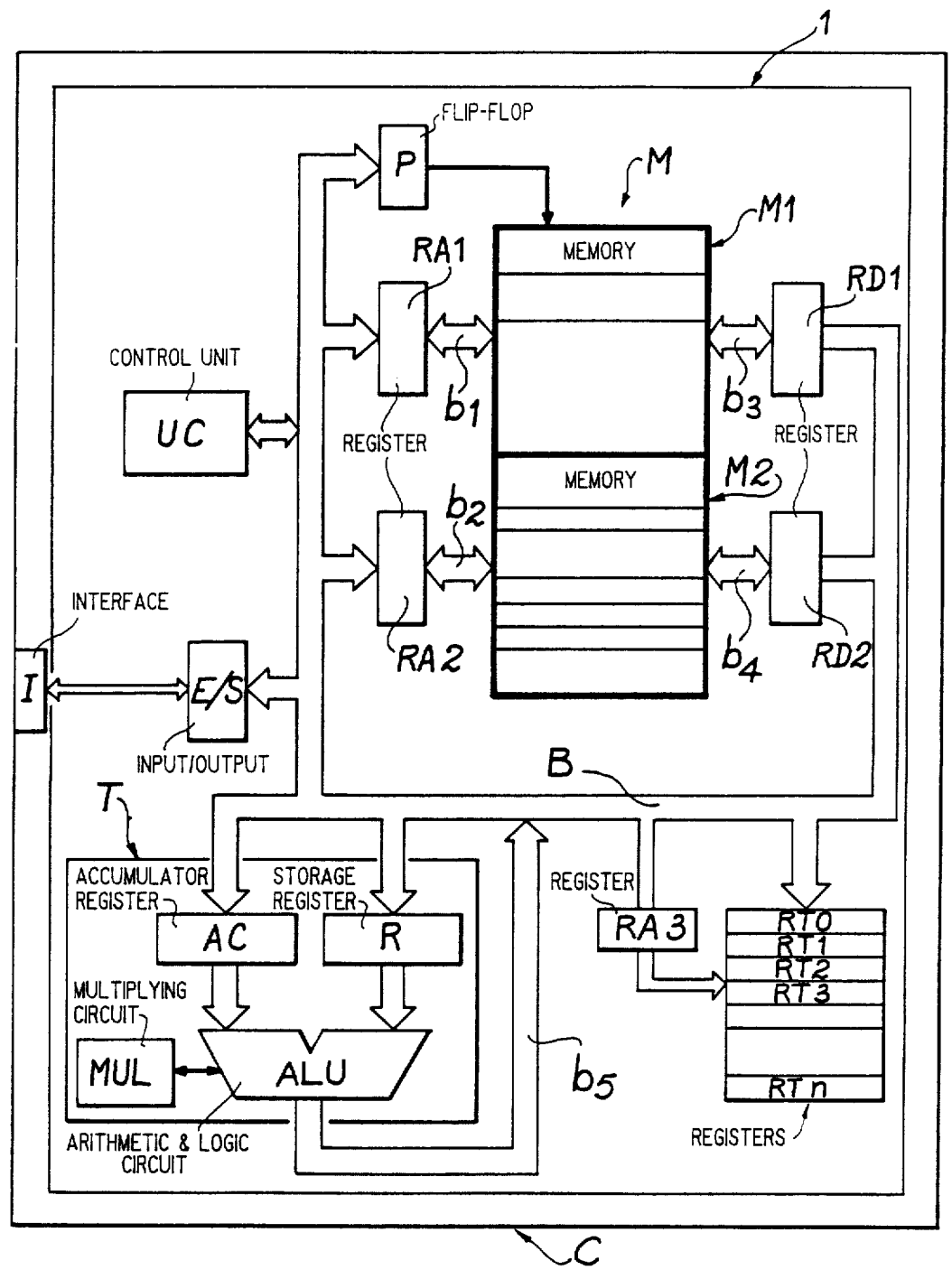

MICROPROCESSOR INTENDED PARTICULARLY FOR EXECUTING THE CALCULATION ALGORITHMS OF A PUBLIC CODE ENCODING SYSTEM

BACKGROUND OF THE INVENTION

The present invention relates to a novel microprocessor structure and more particularly to a microprocessor for executing calculation algorithms of a public code encoding system.

Prior to developing the structure of the microprocessor according to the invention, reference is briefly made to the three main microprocessor groups which are commercially available:

1. Bit slice microprocessors, which are essentially constituted by microprogrammable procesisng uhits, which are juxtaposed so as to obtain a given word length.
2. General purpose microprocessors, which are essentially constituted by a programmable processing unit, which directly interfaces with the external medium by means of three buses, namely an address bus, a data bus and a control bus. These external buses are used for connecting the memory and input/output means. Their construction requires at least two one chip structures, one ensuring the calculation function and the other the storage function, said structures being interconnected by external connections.
3. One chip microprocessors, which are true microcomputers formed on the same silicon substrate. Thus, on a single chip, they comprise at least one processing unit, a memory and an input/output device.

The memories associated with or integrated with these microprocessors are essentially of the RAM and/or ROM and/or PROM and/or EPROM and/or EEPROM types. For a given application, the choice of a microprocessor also involves the choice of the type of memory to be integrated or associated with the microprocessor.

Thus, in numerous applications, it is important to be able to retain the information recorded on energizing the memory. Naturally, this leads to the use of ROM memories, in which writing and erasure are impossible. However, by the very nature of the memory, information relative to a programme or data written into such a memory cannot be modified.

In order to obviate this disadvantage, it is merely necessary to use a non-volatile memory of the PROM type, into which writing takes place and whose content can be modified, or a reprogrammable memory of the EPROM or EEPROM type, whose content can not only be modified, but can also be erased, either by the action of ultraviolet rays (EPROM) or electrically (EEPROM).

It is also obvious that the use of a programmable PROM, EPROM or EEPROM-type memory makes it possible to increase the possibilities of a microprocessor, particularly if the complete sense is given to the programmable word. Thus, this type of memory has normally led to programmable microprocessors.

To place a microprocessor in the programming mode, means that the internal structure of the processing unit will be modified in such a way that the access, address and data buses are available from the outside via specialized connections. It is important to note that it is necessary to stop the microprocessor to permit programming of its memory. This programming means writing an instruction or data into the memory and all the operations necessary for the latter take place under the initiative and exclusive control of the external medium.

This was followed by a more developed type of programming, namely auto-programming, which represents the possibility given to the microprocessor of being able to itself write or modify the content of its own memory, without interrupting the performance of a programme and without any intervention from the external medium.

However, a conventional microprocessor is not auto-programmable. Thus, the control counter ensuring the addressing of the memory cannot both point to a first address of the memory, whose content is to be modified and point to a second address of the same memory to start up a writing sequence in the memory zone located at the first address. A programmable microprocessor is described in French Pat. No. 2,461,301.

Another important component of a microprocessor is its processing unit, which generally comprises an arithmetic and logic unit, a temporary register and an accumulator. All these components make it possible to carry out conventional logic operations. In certain cases, the processing unit also comprises multiplying circuits, which are generally in wired or microprogramme form and outside the processing unit of the microprocessor.

There are numerous applications based on the use of microprocessors and the choice of a microprocessor involves the examination of the aforementioned characteristics, as a function of the specific nature of the envisaged applications. Of all the possible applications, those which are retained hereinafter are the applications involving confidential and/or secret information, which it is necessary to protect in all security.

These informations, which are processed locally or remotely transmitted, must be stored in a protected area of the memory, which is generally of the PROM, EPROM or EEPROM type. In order to protect the same, it is necessary to prevent their reading and/or modification from the outside by unauthorized persons. These interdictions are managed by a programme recorded in the microprocessor memory and are represented by devices which, under the control of the programme, the microprocessor is able to keep locked or is able to temporarily unlock to prevent or allow access to a protected area of the memory as a function of the data supplied to the microprocessor inputs.

If for an application of this type, use is made of a general purpose microprocessor (physically separate processing unit and memory), it is not possible to ensure complete security for the confidential and/or secret information recorded in a protected area of the memory. Thus, although the informations are effectively protected during the performance of the programme, they become accessible when the microprocessor is not operating. As the memory is physically separate from the microprocessor, it is possible to separate it and entirely read it, whilst using test pins correctly positioned onto the input/output hubs of the memory.

However, a one chip microprocessor can make it possible to prevent access to confidential and/or secret information if the microprocessor and its memory are combined on a single chip. This advantage results from the physical structure of such a microprocessor, where the input/output hubs of the memory are not visible.

In certain applications, it is important for the microprocessor to be able to remember certain events which have occurred during the performance of a programme. Thus, it is assumed for example that a defrauder wishes to penetrate the secrets of a system. For this purpose, the defrauder will present information intended to get round the safety device of the system. It is then important that the microprocessor is able to record these attempts at fraud and that it reacts so as to prevent the defrauder from succeeding. For this purpose, it is necessary that the microprocessor records in its memory, each attempt at fraud. As soon as a predetermined number of attempts is reached, the microprocessor places itself in the passive state and takes no further account of any new information presented from the outside. Thus, the microprocessor must be able to remember and modify its behaviour of its own accord. This possibility is offered if it is auto-programmable.

Thus, an auto-programmable one chip microprocessor is the only microprocessor which can act and maintain in all security confidential and secret information recorded in a protected area of its memory.

A particular application which has motivated the structure of the microprocessor according to the invention, more particularly applies to public code encoding systems, because at present no one chip microprocessor is in itself able to fulfil in all security all the functions imposed by such encoding systems.

SUMMARY OF THE INVENTION

The object of the invention is to obviate this problem and consequently proposes a one chip microprocessor, which is more particularly designed to execute calculation algorithms of a public code encoding system formed by a public function and a secret inverse function, of the type comprising at least one programmable read-only memory, a processing unit and an input/output device. It comprises a memory, in which is recorded an algorithm corresponding to the preformance of said secret function and in which the programmable read-only memory contains the secret parameters of said secret functions necessary for the execution of the algorithm and which are inaccessible from the outside. The processing unit can incorporate multiplying circuits, which are also required for the execution of the algorithm.

If such a microprocessor is also auto-programmable, it further increases the security of a public code encoding system, like that known under the abbreviation RSA. Such a microprocessor can advantageously be installed in a detachable portable support, such as a credit card.

BRIEF DESCRIPTION OF THE DRAWING

The invention is described in greater detail hereinafter relative to the attached drawing, which shows an embodiment of the microprocessor according to the invention.

DETAILED DESCRIPTION OF THE INVENTION

The microprocessor 1 according to the invention comprises a memory (M) which, in the represented embodiment, comprises a memory (M1), e.g. of the ROM type, and a memory (M2), e.g. of the PROM, EPROM or EEPROM type. Memory (M) is addressable by two registers (RA1), (RA2), respectively connected to memories (M) by two buses (b1, b2).

Register (RA1) can be used as a temporary storage register and as a control counter for ensuring the progression of addresses from memory (M). Register (RA2) is used as the address register and contains the memory address, whose content is to be modified. The function of these two registers (RA1) and (RA2) can be reversed.

Memory (M) is also connected to two data registers (RD1, RD2), respectively associated with the two address registers (RA1, RA2). An information, such as a programme instruction or data, which is to be read into memory (M) and which is addressed by register (RA1) has its content transferred from memory (M) into register (RD1). In the same way, an information to be written and whose content is stored in register (RA1) is written at the address of memory (M) addressed by register (RD1). The same duality exists with registers (RA2 and RD2).

The two address registers (RA1, RA2) permit the auto-programming of microprocessor 1, the programming of voltage being supplied from a flip-flop (P).

Registers (RD1, RD2) are respectively connected to the memory by two buses (b3, b5). The four registers (RA1, RA2, RD1, RD2) are interconnected by means of a major bus (B).

Microprocessor 1 comprises a processing unit (T) constituted by an arithmetic and logic unit (ALU), connected by its inputs to an accumulator register (AC) and to a temporary storage register (R). These two registers (AC) and (R) are connected by their inputs to the major bus (B). The output of the arithmetic and logic unit (ALU) is connected to bus (B) by means of a bus (b5). Processing unit (T) also comprises multiplying circuits (MUL), designed in a conventional manner and connected to the arithmetic and logic unit (ALU).

The microprocessor also comprises a series of working registers (RT0, RT1 . . . RTn) connected to the major bus (B) and addressed by means of an address register (RA3).

The major bus (B) is connected to an input/output device (E/S), generally constituted by gates. All the components constituting microprocessor 1 are controlled by a control unit (UC).

Such a microprocessor 1 can be advantageously placed on a detachable portable support, such as a card (C). The input/output device (E/S) is then connected to the outside of the card by an interface (I). Such a card (C) can then be connected to a not shown apparatus, whose type is a function of the envisaged application. In exemplified manner, a description will be given hereinafter of the use of such a microprocessor 1 in a public code encoding system.

A public code encoding system consists of two functions, which are the reverse of one another. These consist of a public function represented by an algorithm, which takes account of a public code, and also a secret function represented by a public or secret algorithm, which takes account of a secret code, said function being the reverse of the aforementioned public function. These functions are such that, with the knowledge of the public function, it is substantially impossible to deduce therefrom the inverse function, because of the calculation complexity and the time necessary for obtaining the result. The best known of these public code functions is the Rivest, Shamir and Adleman or R.S.A. function.

This function is expressed in form:
$C = M^e$ modulo n in which

M is the information to be processed, n is the product of at least two high prime numbers (p) and (q), e is a prime integer with (p−1) and (q−1), C is the encoded information or results.

Number (n) is e.g. of form $9n = 2^{4x} + K$, which K between $2^{3x}$ and $2^{3x-1}$.

The number (e) is e.g. chosen equal to 3 and the two prime numbers (p) and (q) are congruent to 2 modulo 3.

In the thus given example of the R.S.A function, the public function consists of raising to the modulo cube (n) an information (M) to be encoded and the inverse secret function consists of extracting the cube root modulo (n) of the encoded information to recover said information in plain form.

The reverse function is thus expressed in the form $$D = C^d \text{ modulo } n.$$

The public code is constituted by a composite number (n), whilst the secret parameters of the secret function are constituted by factors of (n). It is necessary to factorize number (n) to obtain the secret code from number (n).

The execution of such an R.S.A function consequently requires multiplying circuits which, in the illustrated embodiment, are integrated into processing unit (T).

The microprocessor according to the invention is particularly suitable for completely securely performing the inverse function R.S.A. For this purpose, the algorithm corresponding to this function is recorded either in zone (M1), or in zone (M2) of memory (M). The secret parameters are necessarily recorded in memory zone (M2) of memory (M) and are inaccessible from the outside.

Obviously, microprocessor 1 can also execute the algorithm corresponding to the public functions, said algorithm being e.g. recorded in zone (M1) of memory (M). The public code, which is known to everybody, does not have to be prerecorded can be merely introduced from the outside into microprocessor 1.

The fact that the microprocessor is also auto-programmable makes it possible to increase the system security, particularly with regards to the storage of fraud attempts, as described hereinbefore.

It is also possible to record several sets of secret parameters and/or secret functions in the protected memory zone (M2) of memory 1.

What is claimed is:

1. A one chip microprocessor for executing a public key algorithm of a public code encoding system formed by a public function and a secret inverse function of the type comprising at least one programmable read-only memory, a processing unit and an input/output device, wherein it comprises a memory, in which is recorded at least one algorithm corresponding to the performance of said secret function, and wherein the programmable read-only memory contains the secret parameters constituting the secret code and recorded in an area of the read-only memory which is inaccessible from the outside, the processing unit including multiplying circuits for the execution of the algorithm, the microprocessor further including a first address register for addressing an information to be modified into the memory and a second register for the address progression of a writing sequence authorizing the writing of the modified information of the memory, said two registers being respectively associated with two data registers.

2. A microprocessor according to claim 1, wherein said microprocessor makes itself inoperative after the number of fraudulent attempts exceeds a predetermined number.

3. A microprocessor according to claim 1 wherein the aforementioned memory is a read-only memory.

4. A microprocessor according to claim 1, wherein the aforementioned programmable read-only memory is of the EPROM or EEPROM type.

5. A microprocessor according to claim 1, wherein its processing unit comprises supplementary working registers for storing the intermediate results during the execution of the aforementioned algorithm.

6. A microprocessor according to claim 1, wherein it is mounted on a removable portable support, such as a card.

7. On a single self programmable semiconductor chip, a microprocessor for executing a public key algorithm of a public code encoding system formed by a public function and a secret inverse function said chip comprising at least one programmable read-only memory, a processing unit and an input/output device, said chip comprising a memory, in which is recorded at least one algorithm corresponding to the performance of said secret function, and said programmable read-only memory containing the secret parameters constituting the secret inverse function, said secret parameters being in an area of the read-only memory which is inaccessible from the outside, the processing unit processing information contained in said memory and including multiplying circuits for the execution of the algorithm, and means for enabling data to be written in the programmable read-only memory comprising, an address register loaded by said processing unit means for addressing a location address in said PROM and, a data register loaded by said processing unit means for storing data to be modified, means for holding stable the location address and the data, and means for holding stable the write voltage required to write data in said memory during the entire period of the time required by the PROM.

8. A single chip according to claim 7, wherein said microprocessor makes itself inoperative after the number of fraudulent attempts exceeds a predetermined number.

9. A single chip according to claim 7 wherein said means for holding stable location address and the data to be written in said PROM and said means for generating the write voltage comprise a write automaton controlled by said processing unit, said write automaton comprising counting means triggered by said processing unit means to count the elapsed time during which location address and data to be written are held stable and means triggered by said processing unit to enable the write voltage to be transmitted to said memory during the elapsed time and means emitting a release signal indicating the end of counting to said processing unit at the conclusion of a memory write cycle.

10. A single chip according to claim 7 wherein said means for holding stable the location address and the data to be written in said memory and said means for generating the write voltage comprise a sequence of instruction stored in memory means and executed by said processing unit means.

11. A single chip according to one of claim 7, 9 or 10 wherein the aforementioned memory is a read-only memory.

12. A single chip according to one of claims 7, 9 or 10, wherein the aforementioned programmable read-only memory is of the EPROM or EEPROM type.

13. A single chip according to one of claim 7, 9 or 10, wherein its processing unit comprises supplementary working registers for storing the intermediate results during the execution of the aforementioned algorithm.

14. A single chip according to one of claims 7, 9 or 10, wherein it is mounted on a removable portable support, such as a card.

* * * * *